United States Patent [19]
Norcott

[11] Patent Number: 5,848,405
[45] Date of Patent: Dec. 8, 1998

[54] METHOD AND APPARATUS FOR IDENTIFYING NEW DATA BY ADDRESS RANGES

[75] Inventor: William D. Norcott, Nashua, N.H.

[73] Assignee: Oracle Corporation, Redwood Shores, Calif.

[21] Appl. No.: 839,190

[22] Filed: Apr. 21, 1997

[51] Int. Cl.⁶ ............................................. G06F 17/30
[52] U.S. Cl. ..................... 707/1; 707/102; 707/202; 711/112; 711/202
[58] Field of Search ................. 707/1, 102, 202; 711/112, 202

[56] References Cited

U.S. PATENT DOCUMENTS

| | | | |
|---|---|---|---|
| 5,204,958 | 4/1993 | Cheng et al. ........................... | 707/102 |
| 5,301,288 | 4/1994 | Newman et al. ....................... | 711/202 |
| 5,390,315 | 2/1995 | Blandy et al. ......................... | 711/112 |
| 5,581,750 | 12/1996 | Haderle et al. ........................ | 707/202 |
| 5,664,160 | 9/1997 | Fecteau et al. ........................ | 395/500 |
| 5,675,585 | 10/1997 | Hall et al. ............................... | 707/102 |
| 5,687,343 | 11/1997 | Fecteau et al. ........................ | 711/202 |
| 5,727,196 | 3/1998 | Strauss, Jr. et al. ..................... | 707/2 |
| 5,745,894 | 4/1998 | Burrows et al. ....................... | 707/5 |

*Primary Examiner*—Thomas G. Black
*Assistant Examiner*—Jean R. Homere
*Attorney, Agent, or Firm*—McDermott, Will & Emery

[57] ABSTRACT

A method and apparatus for identifying new data stored in data warehouses by storing the new data records at contiguous storage locations, and storing range data that specifies the range of the contiguous storage locations. New data is identified in the database by storing the start location and the end location of the contiguous range of data location, enabling server processes to access the new data records based on the stored range data, without needing to identify the new data records on a row-by-row basis. The arrangement for identifying new data is effective for updating existing summary information of existing data in view of the new data, for example, by generating a delta summary. The delta summary, representing summary information corresponding to the new data, can then be merged with the existing summary data to complete updating the summary data in view of the new data.

17 Claims, 6 Drawing Sheets

| Table | Low ROWID | High ROWID |
|---|---|---|
| sales | X | Y |

| Table | Low ROWID | High ROWID |
|---|---|---|
| sales(&) | A | C |
| sales(&) | D | F |
| sales(&) | G | J |
| sales | K | M |

Figure 6

METHOD AND APPARATUS FOR IDENTIFYING NEW DATA BY ADDRESS RANGES

FIELD OF THE INVENTION

This invention relates to databases and, more specifically, to methods and apparatus for updating data in data warehouses.

BACKGROUND OF THE INVENTION

Computer database systems that are used for data warehousing frequently store precomputed summary information in summary tables in order to speed up query processing. The base data which is summarized in the summary tables is referred to herein as the "summarized data". Summary tables typically store aggregated information, such as "sum of product sales, by region, by month." Other examples of aggregated information include counts of tally totals, minimum values, maximum values, and average calculations. As new detail data is periodically added to the summarized data, the summary information needs to be updated (i.e., refreshed) to reflect the new detail data.

Systems that require the values in summary tables to be recalculated based on all of the summarized data every time new data is supplied have the disadvantage that the recreation process is a relatively lengthy operation due to the size and number of tables from which the summary information is derived. The process of updating summary information may be improved by performing incremental refresh, where rather than generating a new set of summary information based on calculations that use all of the summarized data, the summary information is updated based on previous summary values and the new detail data.

One of the difficulties associated with incremental refresh is the ability to differentiate the new data from the old data. It would be possible for an existing system to identify new data records by writing new records in a two step process, namely (1) write the new data into the database, and (2) write the data identifying the location of each new record (e.g., a "ROWID") into a separate table whose sole purpose is to indicate which records are new. In this case, the database refreshes the summary information by accessing the separate table containing the ROWIDs to determine the new data, retrieving the new rows based on the ROWIDs stored in the new table, and refreshing the summary information based on the data contained in the retrieved rows.

However, storing of the ROWID for each new record into a separate table would be considerably wasteful of existing computer resources including disk space and processor capacity, especially when the new data includes millions of data records. Moreover, the time required to perform incremental refresh operation for the millions of data records is substantially increased, since one I/O operation is required to fetch the ROWID, and another I/O operation is required to access the new data corresponding to the fetched ROWID for each data record.

Hence, there is a need for quickly identifying new detail data in a data warehouse without consuming the amount of resources required to redundantly store the new detail data.

SUMMARY OF THE INVENTION

A method and apparatus for updating data in data warehouses identifies new data by storing a plurality of new data records into the database at contiguous storage locations, and storing range data that specifies the range of the contiguous storage locations. Hence, new data is identified in a database by storing the start location and the end location of a contiguous range of data locations, enabling server processes to access the new data records based on the stored range data without the necessity of accessing another database table on a row by row basis. Hence, a database process can identify a large number of new records using a small number of rowid range records.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus for identifying new detail data is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

HARDWARE OVERVIEW

Figure 1:
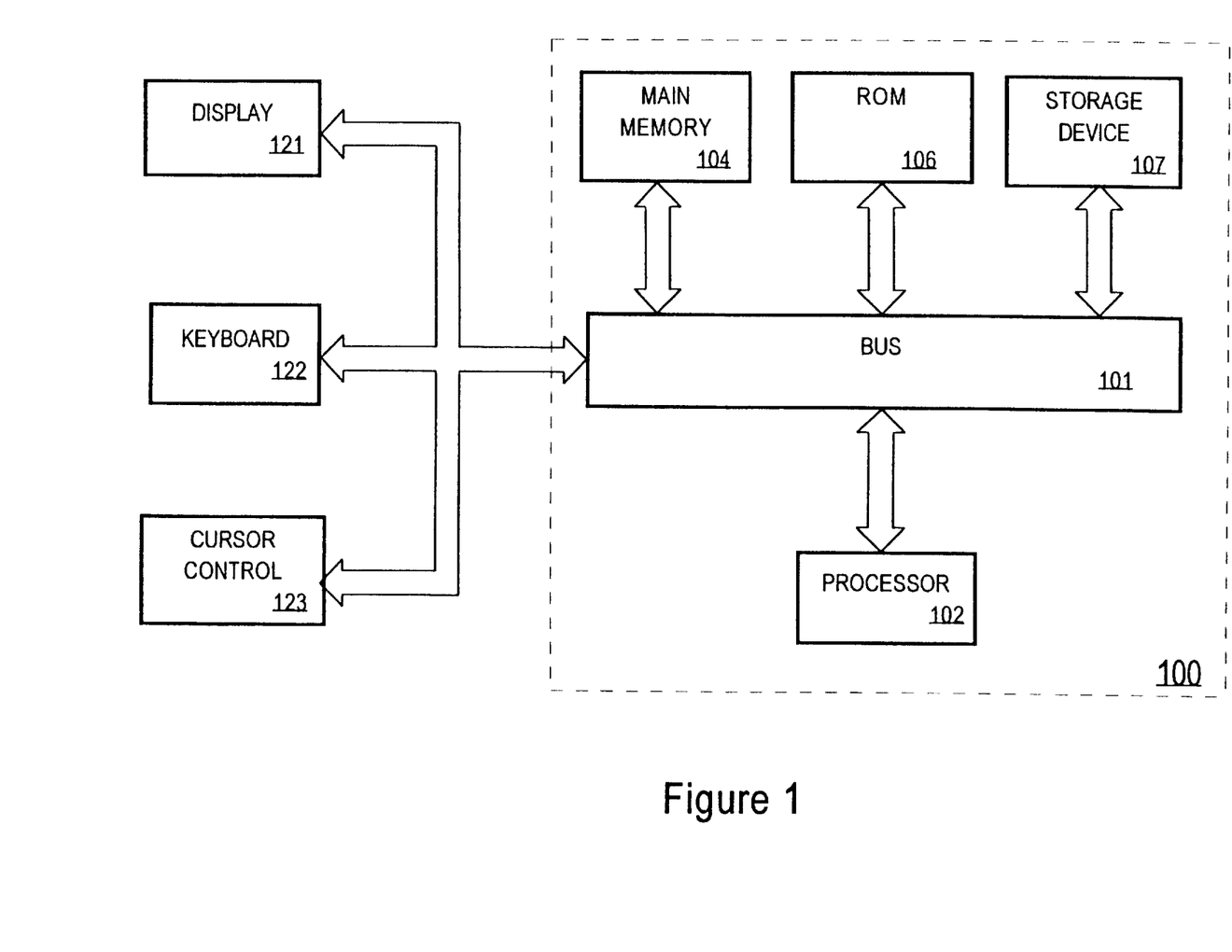
FIG. 1 is a block diagram of a computer system that may be used to implement an embodiment of the invention.

FIG. 1 is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to process queries. According to one embodiment, queries are processed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Figure 2:
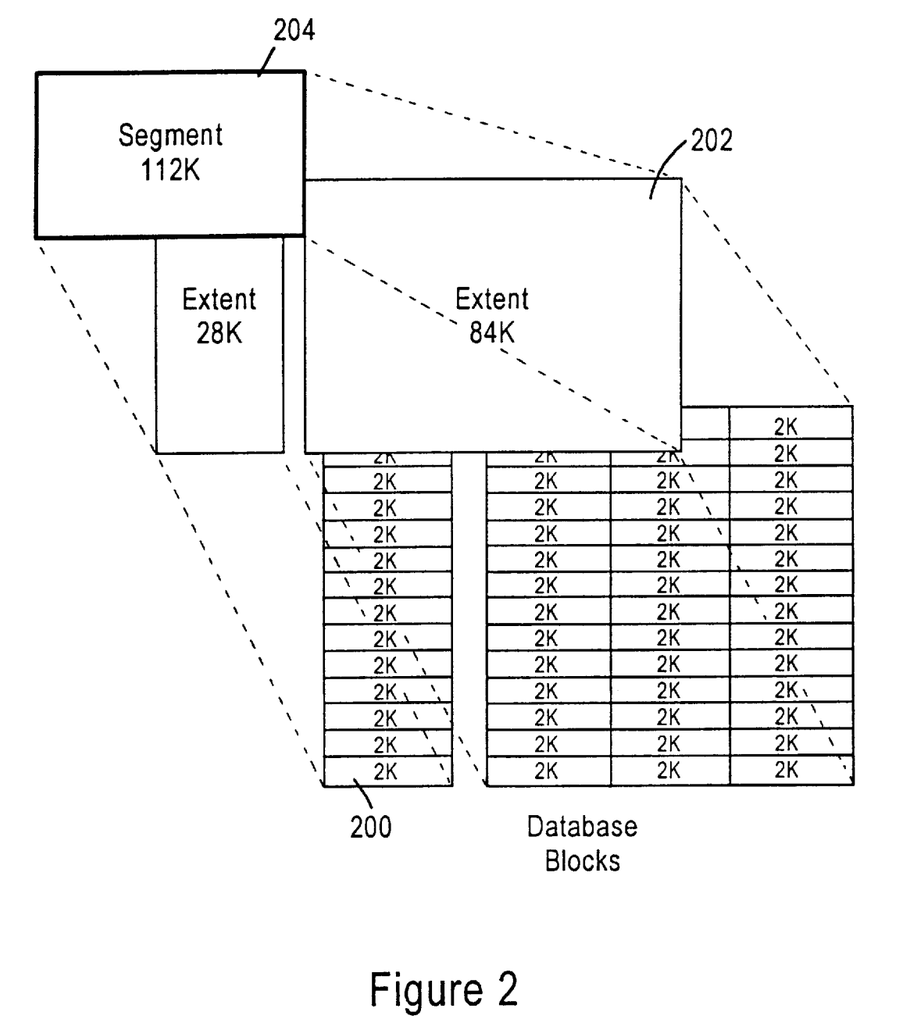
FIG. 2 is a diagram illustrating a memory structure of the database system.

A database system used for data warehousing may frequently store millions of records of data. Consequently, the storage and processing of data records may be made more efficient by providing structural relationships within the database. FIG. 2 is a diagram illustrating the structure of database tables in an exemplary database, such as the database 600 of FIG. 6. For example, a database table 610 may be allocated into units defined as data blocks 200, extents 202, and segments 204.

Data blocks 200 make up the smallest storage units within the database. The data blocks 200, also referred to as logical blocks or pages, correspond to a specific number of bytes of physical space on disk. The size of the data block 200 is set at a prescribed level when the database is originally created, for example, at 2 kilobytes, and typically will be a multiple of the operating system's block size within the maximum limit. Hence, the database system will use and allocate free database space using a data block 200 as its finest resolution.

The next level of logical database space is an extent 202. The extent 202 is a specific number of contiguous data blocks 200 that are allocated for storing a specific type of information.

The next level of logical database storage is a segment 204. A segment 204 is a set of extents 202 that have been allocated for a specific type of data structure, where all the extents 202 are stored in the same tablespace. For example, data for a given table is stored in its own data segment, whereas data for a given index is stored in its own index segment.

Figure 6:
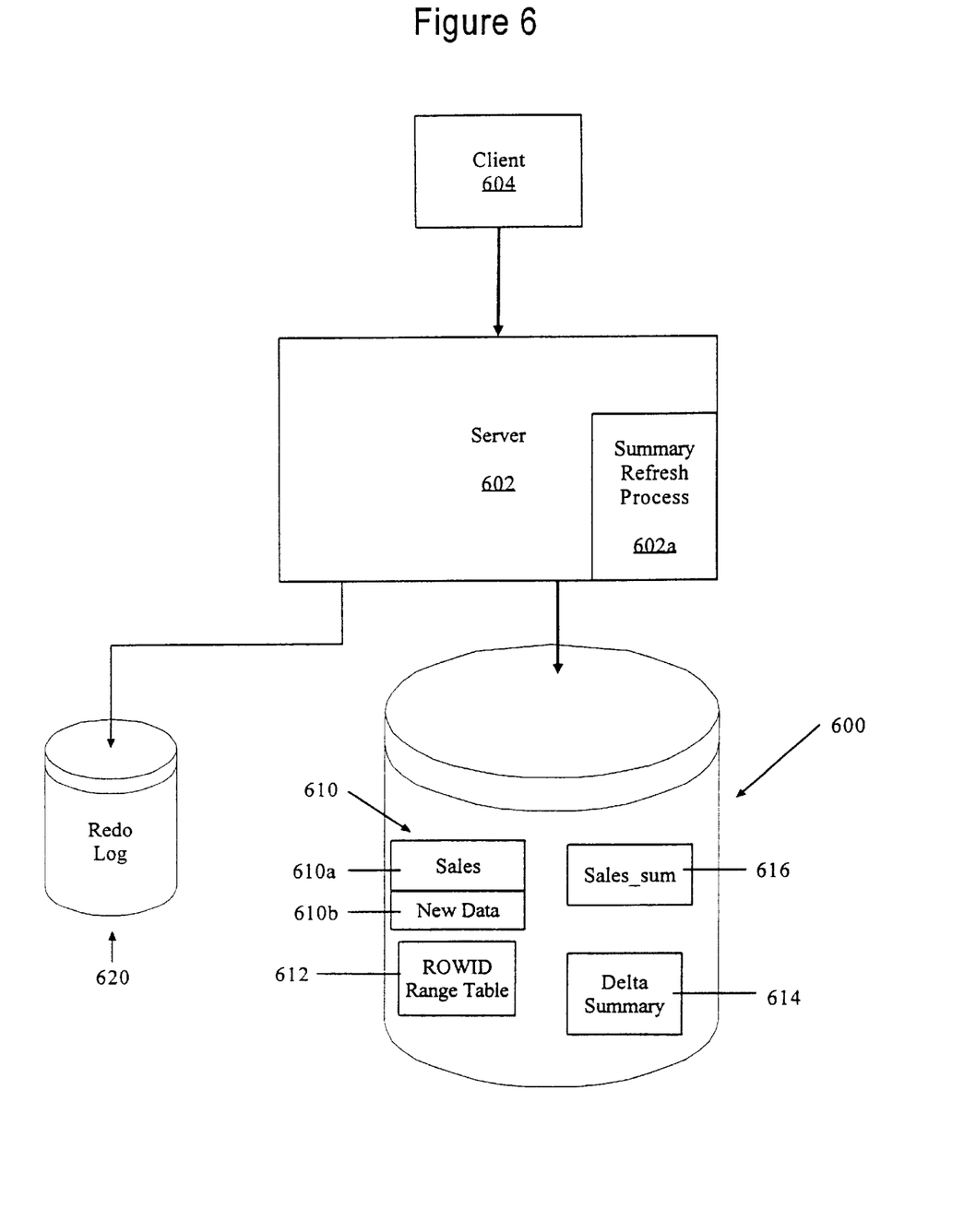
FIG. 6 is a diagram illustrating a structure of a database system according to an embodiment of the present invention.

The database system of FIG. 6 allocates space for segments 204 and extents 202. Hence, when the existing extents 202 of a selected segment 204 are fall and more information is to be stored in the segment 204, the database server 602 will allocate another extent 202 for that segment 204. Since extents 202 are allocated as needed, the extents 202 of a segment 204 may or may not be contiguous on disk, and may or may not span files. As described below, the present invention can identify new data stored in extents 202 by storing the range of ROWIDs for each extent having new data.

INCREMENTAL REFRESH OF SUMMARY INFORMATION

Figure 3:
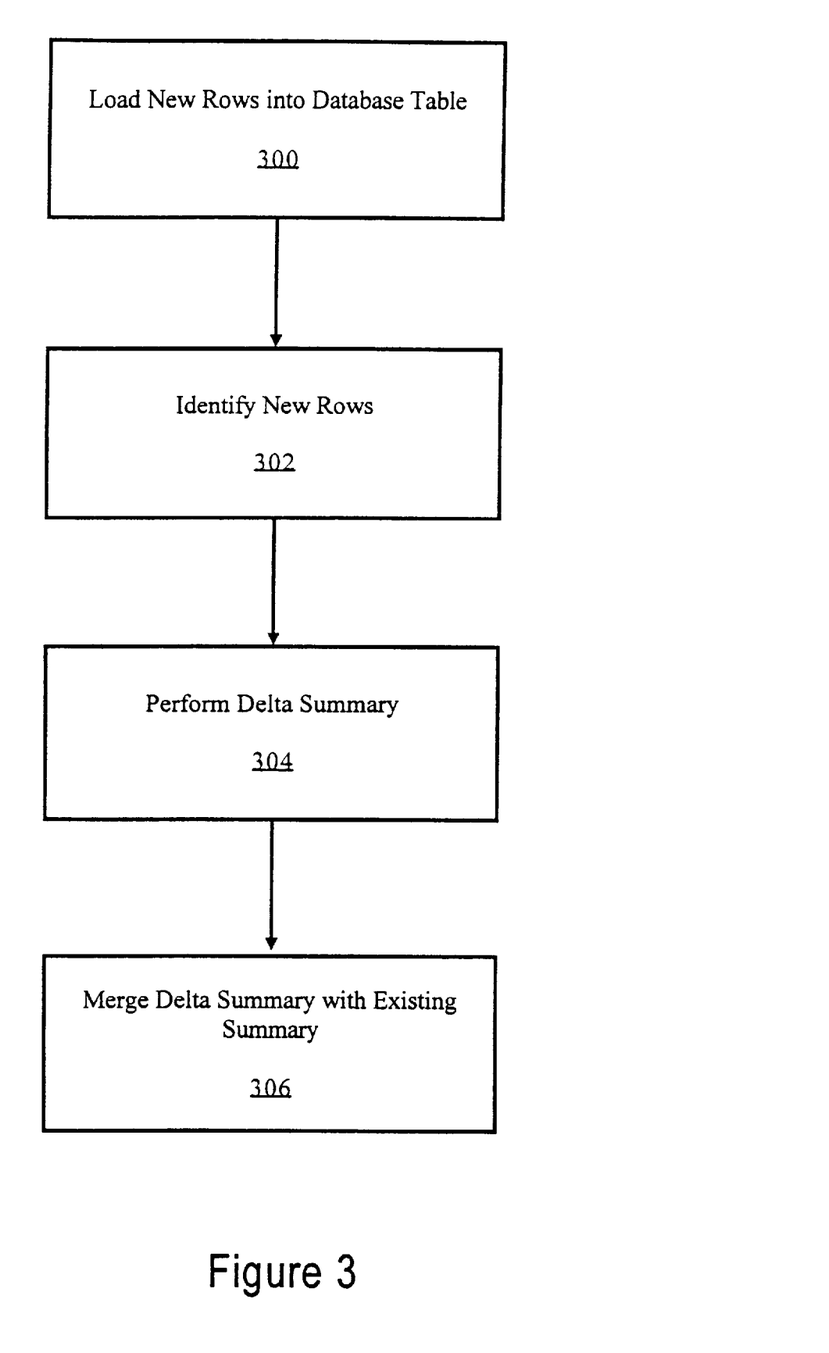
FIG. 3 is a flow diagram illustrating a method of updating summary tables in a data warehouse based on new data.

FIG. 3 is a diagram summarizing a method of updating summary information for which the method of identifying new data records according to the present invention is particularly beneficial, such as when a large number of data records are added to a data warehouse. In such a scenario, thousands or even millions of records, for example sales data or financial transaction data, may be loaded as new data into a data warehouse, and the information in summary tables may need to be updated in view of the new data.

The method for efficiently updating a database table using the database system of FIG. 6 includes a server process 602 loading the new rows of data from an external file into a database table 610 in step 300. The source of the data may be, for example, an online transaction processing (OLTP) database. OLTP databases typically provide a mechanism for exporting data from the database into a static file. The static file may then be loaded by the server process 602 into the database table 610. After the new rows have been stored in the database table 610 as new data 610*b*, the new data will be identified in step 302 to enable database processes to update existing summary information by processing only the new data. As described below, the present invention provides a particularly advantageous technique for identifying the new rows of the data.

After the new rows have been identified by the server process 602, an incremental refresh operation is performed. An incremental refresh operation involves retrieving the new rows, generating a delta summary based on the new rows (step 304), and merging the delta summary with the existing summary data.

Specifically, a summary refresh process 602*a* generates delta summary information with respect to the new data records 610*b*. The delta summary information is summary information that is based only on the new data. After the delta summary has been generated in step 304, the delta summary is then merged with the existing summary values in the summary table 616 to obtain updated summary values, which are then stored in table 616.

For example, assume that an existing summary table stores a value to identify the amount of the highest sale (e.g. Max (sale)). Assume also that highest sale in the existing data is $45. Consequently, the current value stored in the summary information would be $45. Assume that the new data includes a record having a sale of $51.00. In this case, the summary refresh process 602*a* performs delta summary by processing only the new data records 610*b* to identify the new record maximum as $51.00 (New$_{13}$Max =$51). In the case where the summary value is a maximum, the delta summary information is merged by replacing the current maximum with the greater of the current maximum and the delta summary maximum. In the present example, the old maximum $45 would be replaced with the new maximum $51, which would be stored in table 614.

In the example given above, the summary information was a maximum value. Other delta summary operations that may be performed include sum, count (e.g., tally totals), minimum, and average as a function of sum and count operations.

RANGE-BASED IDENTIFICATION OF NEW DATA

Figure 4:
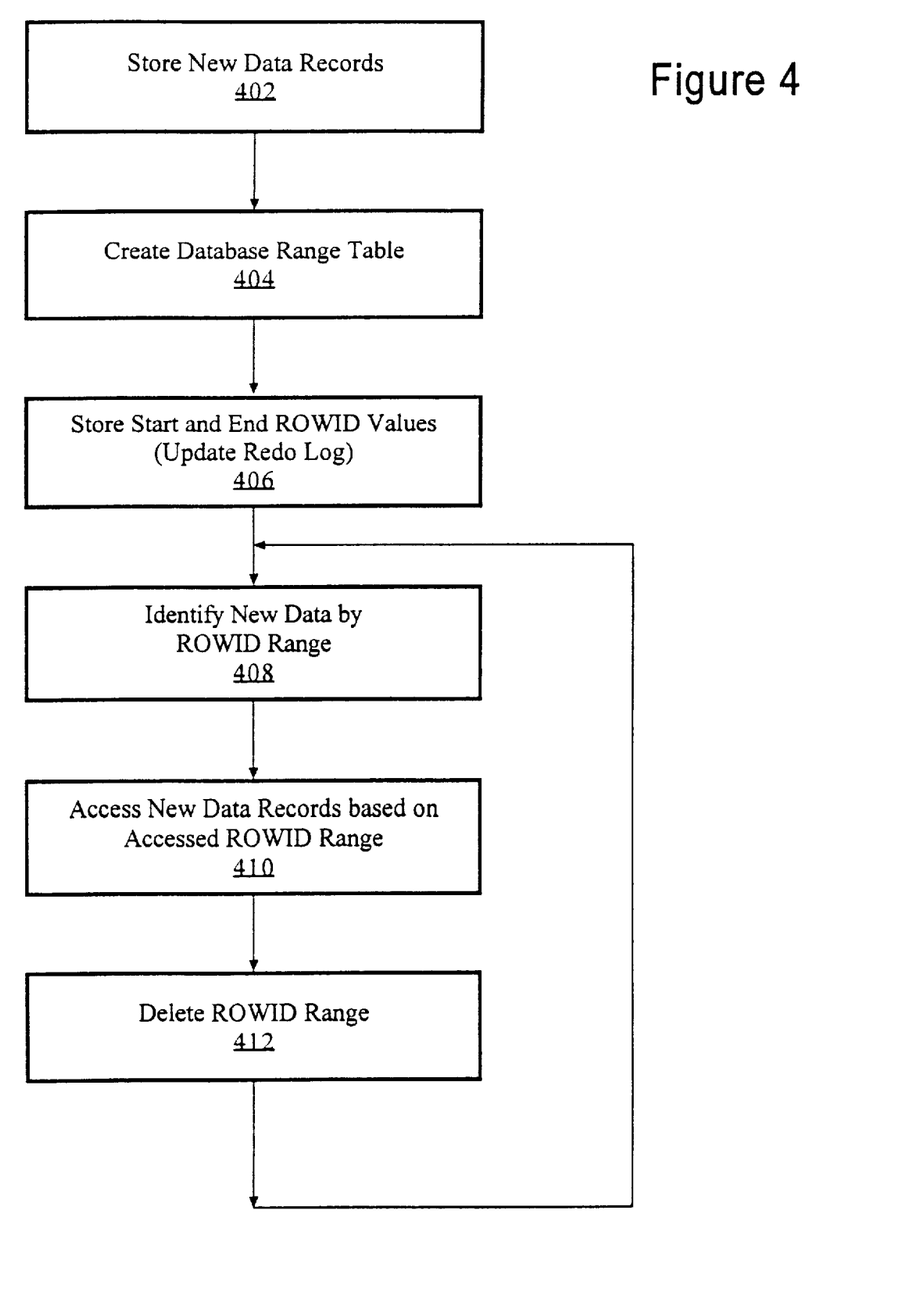
FIG. 4 is a flow diagram illustrating a method for identifying new data records to be stored in a database according to an embodiment of the invention.

FIG. 4 is a diagram illustrating a method for identifying new data records to be stored in a database according to an embodiment of the present invention. The method for identifying new data may be used in any circumstance under which the identification of new records is required. For example, the method may be used during step 302 to identify new rows to be used in delta summary processing in order to update summary information in data warehouses.

The method illustrated in FIG. 4, which may be executed by the server process 602 of FIG. 6, begins with the step of storing new data records in step 402, corresponding to step 300 of FIG. 3. The new data records are typically stored by the server process 602 responding to a request from a client application 604 to insert large quantities of data. For example, the client 604 may periodically request that large quantities of data within a flat file, containing sales data from various retail stores all over the world, be moved into the data table 610.

The server 602 processes the request and stores the new data in the table 610 which already includes existing sales data 610a. Specifically, the server process 602 allocates within the database 600 storage space that corresponds to one or more contiguous sequences of ROWIDs for storage of the new data in the table 610. Depending on storage availability and the structure of the database, the entire set of new data stored in database 600 can be stored in a storage space that corresponds to a single contiguous sequence of ROWIDs (e.g. a single extent or a contiguous portion of a single extent). Alternatively, if the data records are stored in different extents 202, where each extent has a contiguous sequence of ROWIDs.

As shown in FIG. 4, a "range table" is loaded with data that identifies the new data records as the new data records are being stored in the database table 610. The database range table into which the data identifying the new data records are stored, shown in FIG. 6 as the ROWID range table 612, may be a newly-created table (step 404) or an existing range table.

Rather than identify each new record by ROWID, the server process 602 in step 406 stores data that identifies ranges of ROWID, where all records in each identified range are new. The range data stored in the range table may be, for example, the start and end ROWID values of the new data in portion 610b of table 610. Hence, if the new data portion 610b included 10,000 records, then the first ROWID value would have a value x (specifying the ROWID of the first data record of the new data), and the end ROWID would be equal to x+9,999. Hence, the start and end ROWID values are stored in the ROWID range table 612 as range data that identifies the new data within the table 610.

In addition, the server process 602 also updates a redo log 620 (step 406) to indicate the changes made to the range table. The redo log 620 records changes made by all transactions within the database. Since the range data, including the start and end ROWID values, are database objects, updating the redo log 620 to indicate the changes made to the range table ensures that identification of the new data 610b can be recovered in the event of a database crash that affects the data in the ROWID range table 612.

Once the start and end ROWID values are stored in step 406, the server process 602 is able to access the new data records in an efficient manner based on the stored range data to process a query. For example, the server 602 may include a summary refresh process 602a that begins processing of the new data 610b in order to generate delta summary values, stored in the delta summary table 14 to be merged with the existing sales summary data stored in the summary table 616 and corresponding to the existing sales data 610a. The summary refresh process 602a processes the new data in the portion 610b of the database table 610 by accessing the ROWID range table 612 in step 408 in order to identify the new data records. Once the summary refresh process 602a obtains the range data from the ROWID range table 612, the summary refresh process 602 accesses the new data 610b in the table 610 by loading and processing all records that fall between the start ROWID and the end ROWID. This process is repeated for every ROWID range recorded in the range table 612. As described above with respect to FIG. 3, the summary refresh process 602a will then perform the delta summary in step 304 and merge the delta summary with the existing summary in step 306.

Successful access of the new data 610b results in completion of the delta summary and merging processes, with the sales summary 616 being updated to include the new data 610b. Since the data in location 610b no longer needs to be considered as "new data" for refresh processing purposes, the server process 602 deletes the ROWID range information from the ROWID range table 612 in step 412 after the new data records have been accessed and the summary information has been updated.

If the new data records are stored entirely within a single group of data records having a contiguous sequence of ROWIDs, then the summary refresh process is completed after the server process 602 deletes the ROWID range from the ROWID range table 612 in step 412. However, if the new data 610b is stored in a plurality of different extents 202, then the new data 610b may be stored in non-contiguous portions. Steps 408, 410, and 412 are repeated for each extent 202 if the extents 202 are non-contiguous.

Figure 5A:
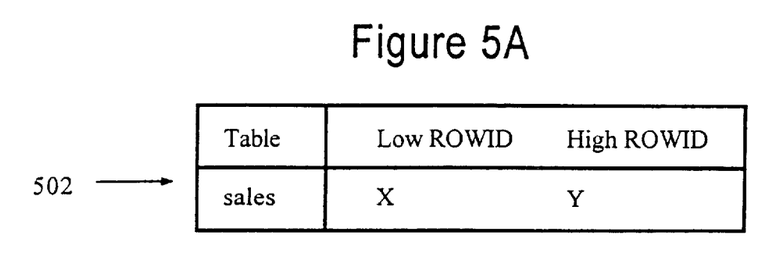
FIGS. 5A and 5B are diagrams illustrating ROWID range tables used to identify a single contiguous range of data and extents of a database table, respectively.
Figure 5B:
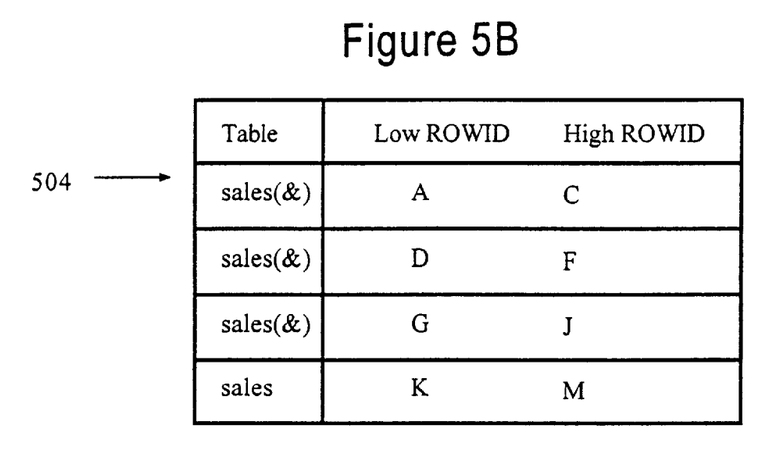

FIGS. 5A and 5B are diagrams illustrating the ROWID range table 612 for storing range data that specifies a range of the contiguous storage location identifiers for a single range, and multiple ranges, respectively. As shown in FIG. 5A, each record in the ROWID range table contains a low ROWID and a high ROWID. For example, table 502 contains a single row identifying the new data 610b within the table "sales" 610. Hence, all database records belonging to the table names "sales" and having ROWIDs in the range between x and y (inclusive) are identified as new records having just been inserted into the database (e.g., table portion 610b). Conversely, any database records whose ROWIDs are outside the range (x, y) are old records.

After all the new records 610b have been added to the "sales" table 610, it is possible to identify the new records 610b by using the ROWID range table 612, for example by processing the SQL select statement:

SELECT*FROM sales
WHERE (ROWID>=X) AND (ROWID<=Y)

The summary refresh process 602a may access the new data 610b by processing such a select statement after obtaining the values of x and y from the ROWID range table 612.

FIG. 5B is a diagram illustrating the structure of the ROWID range table 612 when a plurality of extents 202 are used to store a new data 610b. Specifically, the server process 602, during storage of the new data into the database 600, will allocate extents 202. As shown in FIG. 5B, the table 504 includes a row for each extent. The first table entry specifies an extent having data records with contiguous storage location identifiers having a range within the low ROWID equal to A up to and including the high ROWID equal to C. The second, third, and fourth table entries specify extents 202 having data records at the contiguous ranges of ROWIDs D–F, G–J, and K–M, respectively. If desired, the table column includes a flag ("&") appended to the table name to signify that the next row entry specifies the location of the next extent storing the new data. Hence, the server 602 can access a plurality of ranges for respective extents 202, where the process repeats steps 408, 410, and 412 in FIG. 4 until all the new data stored in the extents have been accessed.

According to an embodiment of the present invention, new data is identified using a single table entry that specifies the range of contiguous ROWIDs for the data records storing the new data. Hence, a process that needs to access the new data can identify the new data using a single access to the ROWID range table, as opposed to needing to determine the ROWID for each and every new data record. Hence, the cost associated with accessing the new data is substantially reduced, since only one record access is necessary to identify the new data. Moreover, the disclosed embodiment increases the speed for loading the new data into the database, since there is no need to separately store the ROWID of every new record that is written into the database.

Although the disclosed embodiments have been directed to storing the start and end ROWIDs to indicate a range, the range information stored in a range table may vary from implementation to implementation. For example, a range may be indicated by a start ROWID and the length of a range. Alternatively, ranges may be allocated in fixed-length increments. Under these conditions, a single start ROWID value may be used to represent the range, since the end of the range represented by the start ROWID may be determined based on the known length of ROWID ranges.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for identifying new data records to be stored in a database, comprising the steps of:

storing a plurality of new data records into the database at storage locations having respective contiguous storage location identifiers;

storing range data that specifies a range of the contiguous storage location identifiers; and accessing the plurality of new data records based on the stored range data.

2. The method of claim 1, further comprising the step of deleting the range data after accessing the plurality of new data records.

3. The method of claim 2, wherein:

the step of accessing the plurality of new data records includes using the new data records to process a query; and the step of deleting the range data is performed after processing the query.

4. The method of claim 1, wherein the step of storing range data includes the steps of:

creating a database table, and storing in the database table a start location and an end location for the range of the contiguous storage location identifiers.

5. The method of claim 4, wherein the step of accessing the plurality of new data records includes accessing the storage locations having the respective storage location identifiers between and including the start location and the end location.

6. The method of claim 1, wherein the step of storing a plurality of new data records includes storing in a first database table successive portions of the plurality of data records in extents of the first database table, the extents having respective groups of said contiguous storage locations.

7. The method of claim 6, wherein:

each said extent has a start location and an end location identifying the range of the corresponding group of said storage locations; and the step of storing range data includes the steps of:

(1) creating a second database table, and (2) storing in the second database table the start location and the end location for each said extent.

8. The method of claim 7, wherein the step of accessing the plurality of new data records includes:

processing a query for a first of said extents by accessing from the first data table the storage locations having the respective storage location identifiers between and including the start location and the end location of an extent; and repeating the step of processing said query for each of the successive contiguous extents.

9. The method of claim 7, further comprising the step of logging in a log table the storage of the start location and the end location for each said extent.

10. The method of claim 1, wherein the step of accessing the plurality of new data records includes obtaining data values from the new data records, the method further comprising the step of performing an incremental update on summary data based on the obtained data values from the new data records.

11. A computer readable medium having stored thereon sequences of instructions for identifying new data records to be stored in a database, said sequences of instructions including instructions which, when executed by a processor, cause the processor to perform the steps of:

storing a plurality of new data records into the database at storage locations having respective contiguous storage location identifiers;

storing range data that specifies a range of the contiguous storage location identifiers; and accessing the plurality of new data records based on the stored range data.

12. The computer-readable medium of claim 11, wherein the sequences of instructions include instructions which, when executed by said processor, cause the processor to perform the additional steps of:

creating a database table, and storing in the database table a start location and an end location for the range of the contiguous storage location identifiers.

13. The computer-readable medium of claim 12, wherein the step of accessing the plurality of new data records includes accessing the storage locations having the respective storage location identifiers between and including the start location and the end location.

14. The computer-readable medium of claim 11, wherein the step of storing a plurality of new data records includes storing in a first database table successive portions of the plurality of data records in extents of the first database table, the extents having respective groups of said contiguous storage locations.

15. A database system comprising:
   a database storing a table of data records, a summary table of summary characteristics of the data records, and a new data record range table;
   a database server for storing new records into contiguous storage locations the table of database records, the database server storing range data in the new data record range table that specifies a range of the contiguous storage locations storing the new records, wherein the database server accesses the new data records based on the stored range data.

16. The database system of claim 15, further comprising a transaction log that stores the transaction of the database server storing the range data in the new data record range table.

17. The database system of claim 15, wherein the database server deletes the range data in response to accessing the new records.

* * * * *